US012011929B2

(12) United States Patent
Shinomiya et al.

(10) Patent No.: US 12,011,929 B2
(45) Date of Patent: Jun. 18, 2024

(54) INK JET PRINTER INCLUDING WIPER TO WIPE NOZZLE SURFACE AND WIPER CLEANER TO CLEAN WIPER

(71) Applicant: Roland DG Corporation, Hamamatsu (JP)

(72) Inventors: Bunji Shinomiya, Hamamatsu (JP); Yuichi Sugiyama, Hamamatsu (JP); Masato Kubo, Hamamatsu (JP)

(73) Assignee: ROLAND DG CORPORATION, Shizuoka (JP)

( * ) Notice: Subject to any disclaimer, the term of this patent is extended or adjusted under 35 U.S.C. 154(b) by 153 days.

(21) Appl. No.: 17/412,306

(22) Filed: Aug. 26, 2021

(65) Prior Publication Data

US 2021/0379897 A1 Dec. 9, 2021

Related U.S. Application Data

(63) Continuation of application No. PCT/JP2020/005134, filed on Feb. 10, 2020.

(30) Foreign Application Priority Data

Feb. 28, 2019 (JP) ................................ 2019-036353

(51) Int. Cl.
*B41J 2/165* (2006.01)

(52) U.S. Cl.
CPC .. *B41J 2/16538* (2013.01); *B41J 2002/16582* (2013.01)

(58) Field of Classification Search
CPC .......... B41J 2/16538; B41J 2002/16582; B41J 2/16541; B41J 2/16517
See application file for complete search history.

(56) References Cited

U.S. PATENT DOCUMENTS

| | | | |
|---|---|---|---|
| 11,400,719 B2 * | 8/2022 | Kobayashi | ........... B41J 2/16538 |
| 2002/0075350 A1 | 6/2002 | Sawicki | |
| 2011/0090281 A1 | 4/2011 | Miyazawa et al. | |

(Continued)

FOREIGN PATENT DOCUMENTS

| | | |
|---|---|---|
| JP | 2006-205517 A | 8/2006 |
| JP | 2008-149709 A | 7/2008 |

(Continued)

OTHER PUBLICATIONS

Official Communication issued in International Patent Application No. PCT/JP2020/005134, dated Apr. 21, 2020.

*Primary Examiner* — Sharon Polk
(74) *Attorney, Agent, or Firm* — Keating & Bennett, LLP

(57) ABSTRACT

A printer includes an ink head including a nozzle surface on which a nozzle is provided, a wiper extending upward to wipe the nozzle surface, a wiper mover to move the wiper in a sub-scanning direction, a wiper cleaner disposed downstream of a carriage and extending downward to remove ink adhering to the wiper, and a controller configured or programmed to control the wiper mover. The controller is configured or programmed to control the wiper mover such that the nozzle surface is wiped by the wiper after bringing the wiper into contact with the wiper cleaner or to bring the wiper into contact with the wiper cleaner after wiping the nozzle surface by the wiper.

19 Claims, 10 Drawing Sheets

(56) References Cited

U.S. PATENT DOCUMENTS

| | | | | |
|---|---|---|---|---|
| 2011/0090283 | A1* | 4/2011 | Miyazawa | B41J 2/16547 347/33 |
| 2011/0102494 | A1* | 5/2011 | Miyazawa | B41J 2/16547 347/20 |
| 2020/0207098 | A1* | 7/2020 | Sugiyama | B41J 2/16544 |
| 2021/0060955 | A1* | 3/2021 | Levy | B41J 2/16544 |

FOREIGN PATENT DOCUMENTS

| | | | | |
|---|---|---|---|---|
| JP | 2011-056889 | A | | 3/2011 |
| JP | 2011-104980 | A | | 6/2011 |
| JP | 2017-064921 | A | | 4/2017 |
| JP | 2020138519 | A | * | 9/2020 |

* cited by examiner

INK JET PRINTER INCLUDING WIPER TO WIPE NOZZLE SURFACE AND WIPER CLEANER TO CLEAN WIPER

CROSS REFERENCE TO RELATED APPLICATIONS

This application claims the benefit of priority to Japanese Patent Application No. 2019-036353 filed on Feb. 28, 2019 and is a Continuation Application of PCT Application No. PCT/JP2020/005134 filed on Feb. 10, 2020. The entire contents of each application are hereby incorporated herein by reference.

BACKGROUND OF THE INVENTION

1. Field of the Invention

The present teaching relates to an ink jet printer.

2. Description of the Related Art

An ink jet printer known to date includes an ink head including a plurality of nozzles that discharge ink and a nozzle surface on which the nozzles are formed, and performs predetermined printing on a recording medium in an ink jet manner. It is essential for this ink jet printer to include a maintenance mechanism for cleaning inks and dust adhering to portions near the nozzles.

A known maintenance mechanism is, for example, a wiper for wiping a nozzle surface on which nozzles are formed, as described in JP2017-64921A. When the wiper and the nozzle surface move relative to each other with the wiper being in contact with the nozzle surface, ink and dust adhering to the nozzle surface is wiped off by the wiper. In this manner, solidification of ink can be prevented on the nozzle surface so that a failure in discharging ink can be prevented. After wiping of the nozzle surface, ink adheres to the wiper, and thus, it is important to remove ink adhering to the wiper. As a method for removing ink on the wiper, a method of applying a cleaning solution to the wiper is proposed, for example.

Examples of the method for removing ink on the wiper can include a method of bringing the wiper into contact with a member showing a relatively high ink absorbency. With this method, ink can be removed from the wiper. In wiping the nozzle surface by the wiper, ink is preferably removed from the wiper as much as possible.

SUMMARY OF THE INVENTION

Preferred embodiments of the present invention provide ink jet printers each capable of wiping a nozzle surface by a wiper with reduction of ink adhering to the wiper.

An ink jet printer according to a preferred embodiment of the present teaching includes an ink head including a plurality of nozzles to discharge ink onto a recording medium and a nozzle surface on which the plurality of nozzles are provided; a carriage on which the ink head is mounted and which is movable in a main scanning direction; a wiper extending upward to wipe the nozzle surface; a wiper mover to move the wiper in a sub-scanning direction perpendicular or substantially perpendicular to the main scanning direction; a wiper cleaner disposed upstream or downstream of the carriage in the sub-scanning directions and extending downward, to contact the wiper and remove ink adhering to the wiper; and a controller configured or programmed to control the carriage and the wiper mover. The controller is configured or programmed to control the wiper mover such that the nozzle surface is wiped by the wiper after bringing the wiper into contact with the wiper cleaner or by bringing the wiper into contact with the wiper cleaner after wiping the nozzle surface with the wiper.

In an ink jet printer according to a preferred embodiment of the present teaching, the controller is configured or programmed to control the wiper mover such that the wiper is brought into contact with the wiper cleaner and then the wiper wipes the nozzle surface. Since the wiper is brought into contact with the wiper cleaner before wiping of the nozzle surface as described above, the amount of ink adhering to the wiper has been removed at the wiping of the nozzle surface by the wiper. Accordingly, the wiper can remove ink from the nozzle surfaces more effectively. The controller is configured or programmed to control the wiper mover such that the wiper is brought into contact with the wiper cleaner after wiping of the nozzle surface by the wiper. In the manner described above, since the wiper is brought into contact with the wiper cleaner after wiping of the nozzle surface as described above, the amount of ink adhering to the wiper has been removed at next wiping of the nozzle surface by the wiper. Accordingly, the wiper can remove ink from the nozzle surface more effectively.

According to a preferred embodiment of the present teaching, the nozzle surface can be wiped by the wiper with reduction of ink adhering to the wiper.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
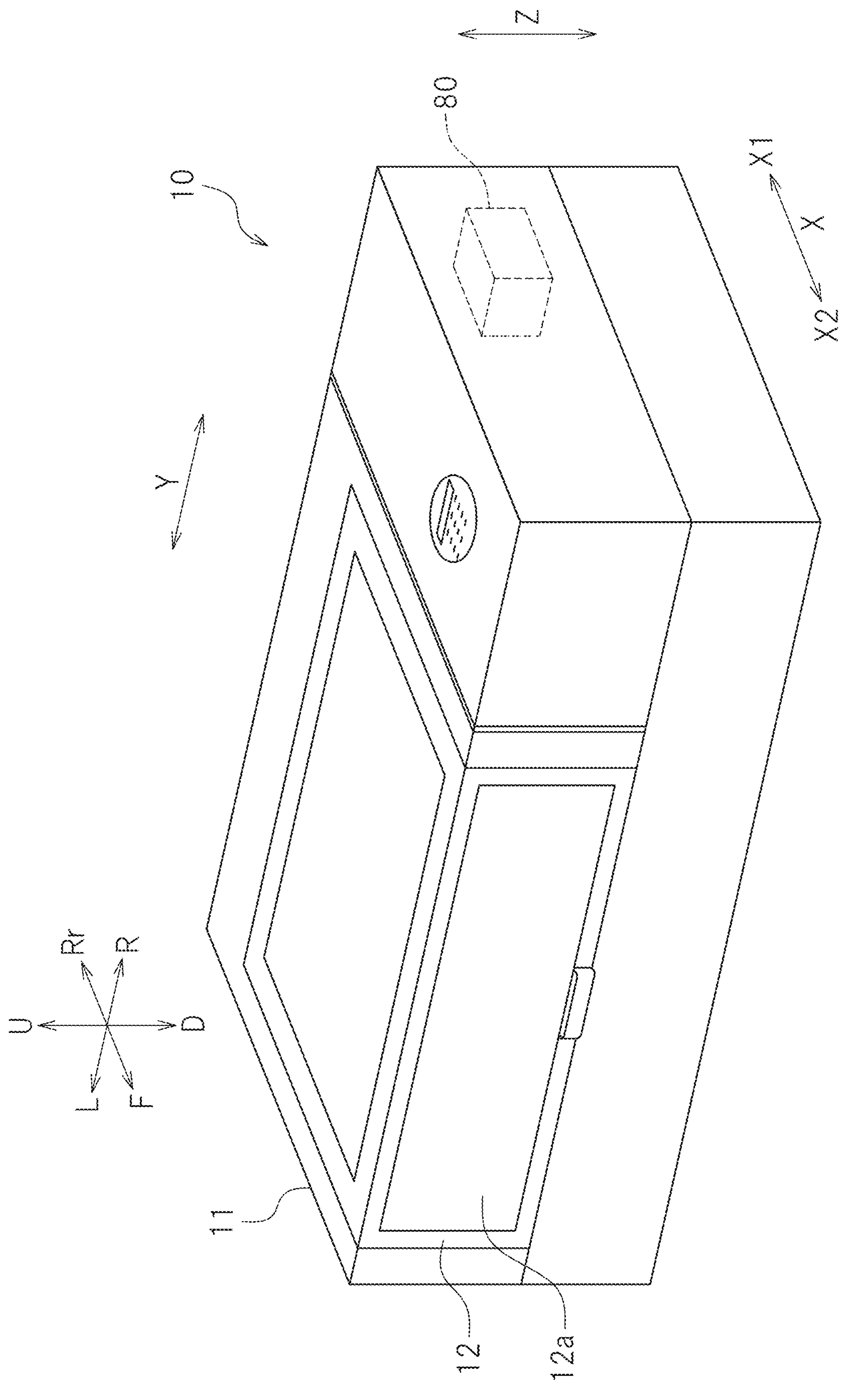
FIG. 1 is a perspective view illustrating a printer according to a preferred embodiment of the present invention.

Preferred embodiments of the present teaching will be described hereinafter with reference to the drawings. The preferred embodiments described herein are not intended to limit the present teaching. Elements and features having the same functions are denoted by the same reference numerals, and description for the same members and parts will not be repeated or will be simplified as appropriate.

FIG. 1 is a perspective view illustrating an ink jet printer 10 (hereinafter referred to as a printer 10) according to this preferred embodiment. The printer 10 performs printing on a recording medium 5 (see FIG. 2). The recording medium 5 is, for example, a recording sheet. The recording medium 5, however, is not limited to a recording sheet. The recording medium 5 may be other media such as a resin sheet or a film of, for example, polyvinyl chloride or polyester or fabrics such as a woven fabric or a nonwoven fabric, as well as a paper sheet such as plain paper or ink jet printing paper.

In the following description, when the printer 10 is seen from the front, a direction away from the printer 10 will be referred to as forward, and a direction toward the printer 10 will be referred to as rearward, unless otherwise specified. Left, right, up, and down respectively refer to left, right, up, and down when the printer 10 is seen from the front. Characters F, Rr, L, R, U, and D in the drawings represent front, rear, left, right, up, and down, respectively. Character Y represents main scanning directions in the drawings. In this preferred embodiment, the main scanning directions Y are left-right directions. Character X represents sub-scanning directions. In this preferred embodiment, the sub-scanning directions X are front-rear directions. Character Z represents top-bottom directions. The main scanning directions Y, the sub-scanning directions X, and the top-bottom directions Z are perpendicular or substantially perpendicular to one another. It should be noted that the directions described above are defined simply for convenience, and are not intended to limit the state of installation of the printer 10 and do not limit the present teaching.

Figure 2:
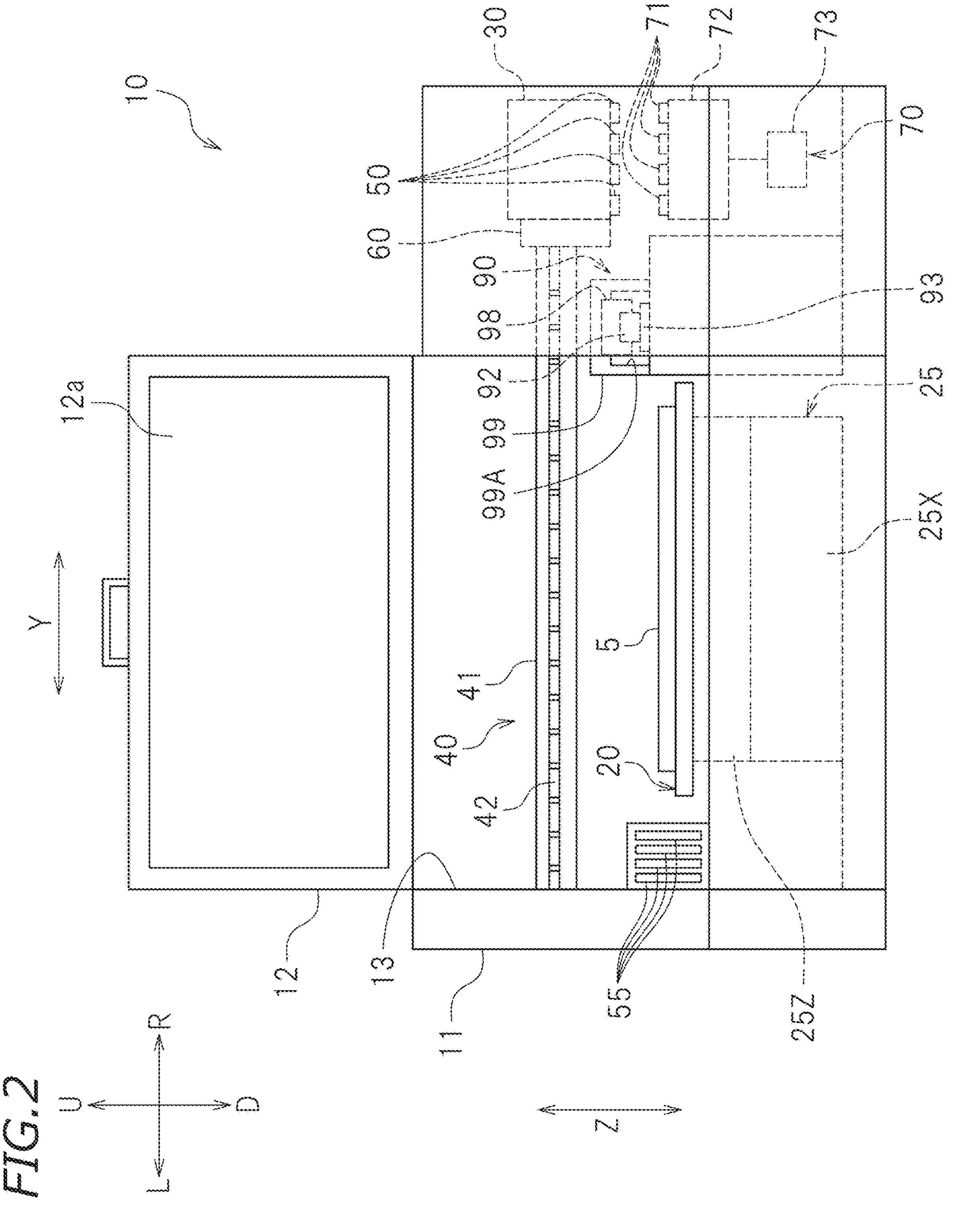
FIG. 2 is a front view illustrating a printer with a front cover open according to a preferred embodiment of the present invention.

As illustrated in FIG. 1, the printer 10 has a box shape. In this preferred embodiment, the printer 10 includes a case 11 and a front cover 12. FIG. 2 is a front view illustrating the printer 10 with the front cover 12 open. As illustrated in FIG. 2, a front portion of the case 11 includes an opening 13. The front cover 12 can freely open and close the opening 13 of the case 11. In this preferred embodiment, the front cover 12 is supported by the case 11 to be rotatable about the rear end. The front cover 12 includes a window portion 12*a*. The window portion 12*a* is made of, for example, a transparent acrylic plate. A user is capable of visually recognizing internal space of the case 11 through the window portion 12*a*.

As illustrated in FIG. 2, the printer 10 includes a table 20, a table mover 25, a carriage 30, a carriage mover 40, a plurality of ink heads 50, a light emitter 60, a capping unit 70, a controller 80 (see FIG. 1), and a wiping unit 90. These components are disposed in the internal space of the case 11.

As illustrated in FIG. 2, the recording medium 5 is placed on the table 20. The printer 10 according to this preferred embodiment is a so-called flat-bed type printer. The table 20 is disposed substantially at the center in the internal space of the case 11 in the main scanning directions Y. The table 20 is a flat-plate member. The table 20 is disposed with flat surfaces facing in the top-bottom directions Z. Although not shown, the table 20 includes a plurality of holes for sucking and fixing the recording medium 5. The plurality of holes penetrate the table 20 in the top-bottom directions Z. An unillustrated fan, for example, is disposed below the table 20. The fan sucks air through the holes so that the recording medium 5 is thereby attached by vacuum.

As illustrated in FIG. 2, the table mover 25 is disposed under the table 20. The table mover 25 moves the table 20 in the sub-scanning directions X and in the top-bottom directions Z. The table 20 is supported by the table mover 25 from below. The table mover 25 includes a first mover 25X and a second mover 25Z. The first mover 25X supports the second mover 25Z and moves the second mover 25Z in the sub-scanning directions X. That is, the first mover 25X moves the table 20 in the sub-scanning directions X. In this preferred embodiment, the first mover 25X includes an unillustrated ball screw mechanism. The ball screw mechanism is driven by an X-axis direction motor 26X (see FIG. 7). The second mover 25Z supports the table 20 and moves the table 20 in the top-bottom directions Z. In this preferred embodiment, the second mover 25Z includes an unillustrated ball screw mechanism. The ball screw mechanism is driven by a Z-axis direction motor 26Z (see FIG. 7). The second mover 25Z is supported by the first mover 25X from below. The table mover 25 is not limited to a specific configuration. For example, mechanisms that move the first mover 25X and the second mover 25Z are not necessarily the ball screw mechanisms. Driving forces of these mechanisms may not be motors. The positional relationship between the first mover 25X and the second mover 25Z in the top-bottom directions may be reversed. The X-axis direction motor 26X and the Z-axis direction motor 26Z of the table mover 25 are electrically connected to the controller 80 and controlled by the controller 80.

As illustrated in FIG. 2, the carriage 30 is provided with the plurality of ink heads 50 and the light emitter 60. The carriage 30 is disposed above the table 20, and movable in the main scanning directions Y. The carriage 30 is moved by the carriage mover 40. The carriage mover 40 moves the carriage 30 in the main scanning directions Y. The carriage mover 40 is configured to move the carriage 30 such that the carriage 30 is located above the capping unit 70 and the wiping unit 90 described later. The carriage mover 40 includes a guide rail 41, a belt 42, unillustrated left and right pulleys, and a Y-axis direction motor 43 (see FIG. 7).

As illustrated in FIG. 2, the guide rail 41 extends in the main scanning directions Y. The guide rail 41 is disposed above the table 20. The carriage 30 is slidably engaged with the guide rail 41. The guide rail 41 guides movement of the carriage 30 in the main scanning directions Y.

An endless belt 42 is fixed to the carriage 30. The belt 42 is wound around unillustrated pulleys at the right and left of the guide rail 41. The Y-axis direction motor 43 (see FIG. 7) is attached to one of the pulleys. The Y-axis direction motor 43 is electrically connected to the controller 80 and controlled by the controller 80. When the Y-axis direction motor 43 is driven, the pulley rotates, and the belt 42 runs. Accordingly, the carriage 30 moves in the main scanning directions Y along the guide rail 41. That is, movement of the carriage 30 is controlled by the controller 80.

Figure 3:
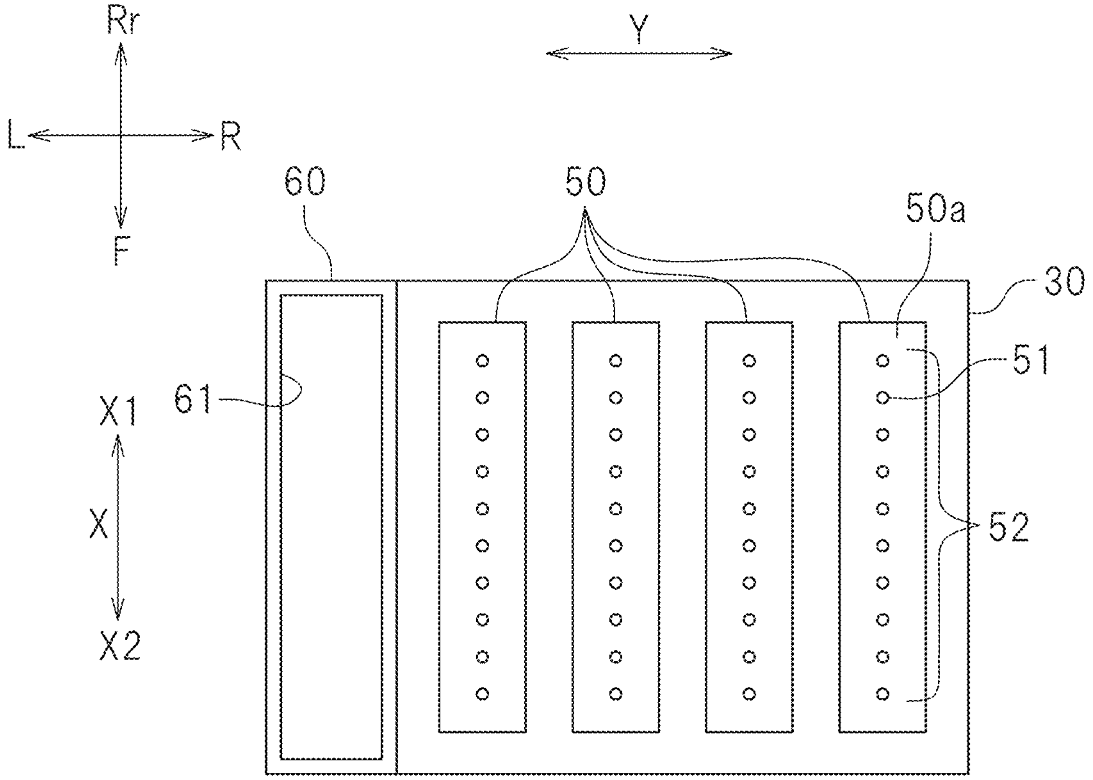
FIG. 3 is a bottom view schematically illustrating a configuration at a bottom surface of a carriage according to a preferred embodiment of the present invention.

As illustrated in FIG. 2, the plurality of ink heads 50 are mounted on the carriage 30. The ink heads 50 are disposed such that nozzle surfaces 50*a* (see FIG. 3) thereof described later are located below the lower surface of the carriage 30. FIG. 3 is a bottom view schematically illustrating a configuration on the lower surface of the carriage 30. As illustrated in FIG. 3, the plurality of ink heads 50 are arranged side by side in the main scanning directions Y. Each of the plurality of ink heads 50 is longer in the sub-scanning directions X than in the main scanning directions Y. Each of the ink heads 50 includes a plurality of nozzles 51 aligned in the sub-scanning directions X, and the nozzle surface 50*a* on which the plurality of nozzles 51 are provided. The nozzles 51 include minute holes from which ink is discharged onto the recording medium 5 (see FIG. 2). In the ink heads 50, the plurality of nozzles 51 are arranged in the sub-scanning directions X to define nozzle rows 52. In this preferred embodiment, a single nozzle row 52 is provided in each ink head 50, but two or more nozzle rows 52 may be provided in each ink head 50. In FIG. 3, the number of nozzles 51 in each nozzle row 52 is 10, but a larger number (e.g., about 200 to 300) nozzles 51 are actually provided. The number of nozzles 51 in each nozzle row 52 is not limited.

As illustrated in FIG. 2, the printer 10 includes a plurality of ink cartridges 55. The plurality of ink cartridges 55 is connected to the ink heads 50 by unillustrated ink tubes. The ink cartridges 55 are containers that store ink. In this preferred embodiment, the ink cartridges 55 store photocurable ink. The photocurable ink is UV curable ink that is cured with application of ultraviolet radiation in this preferred embodiment. The component and properties of the photocurable ink are not specifically limited. The color of ink to be stored is not specifically limited. Examples of ink stored in the plurality of ink cartridges 55 include process color ink of CMYK and spot color ink such as clear ink and white ink.

As illustrated in FIG. 3, the light emitter 60 is mounted on the carriage 30. The light emitter 60 applies light for curing photocurable ink. The light emitter 60 applies light to photocurable ink discharged onto the recording medium 5. The light emitter 60 includes an unillustrated light source and an irradiation port 61. The light emitter 60 applies light downward from the irradiation port 61. The irradiation port 61 extends in the sub-scanning directions X. The light emitter 60 is disposed at the left of the ink heads 50 in this preferred embodiment. The light emitter 60 may be disposed at the right of the ink heads 50. The light emitter 60 may be disposed at each of the left and right sides of the ink heads 50. The light emitter 60 is electrically connected to the controller 80 (see FIG. 2) and controlled by the controller 80.

As illustrated in FIG. 2, the capping unit 70 is disposed near the right end of the printer 10. As illustrated in FIG. 2, the capping unit 70 includes a plurality of caps 71, a cap mover 72, and a suction pump 73.

As illustrated in FIG. 2, the caps 71 are configured to be attached to the nozzle surfaces 50*a* of the ink heads 50. The number of the caps 71 is equal to the ink heads 50. The plurality of caps 71 are arranged in the main scanning directions Y. Each of the caps 71 has a bottomed box shape whose upper portion is open. Each of the caps 71 is made of, for example, rubber. When the caps 71 are attached to the ink heads 50, the caps 71 come to be in intimate contact with the nozzle surfaces 50*a*, and the nozzle surfaces 50*a* are covered with the caps 71. The caps 71 protect the nozzles 51 and the nozzle surfaces 50*a* against dryness when being attached to the ink heads 50.

As illustrated in FIG. 2, the cap mover 72 supports the plurality of caps 71 such that the caps 71 are movable in the top-bottom directions Z. The cap mover 72 attaches the caps 71 to the ink heads 50 by lifting the caps 71. The cap mover 72 detaches the caps 71 from the ink heads 50 by lowering the caps 71. The cap mover 72 includes, for example, a ball screw mechanism and a driving motor 74 (see FIG. 7). When the driving motor 74 is driven, the ball screw mechanism causes the caps 71 to move in the top-bottom directions Z.

As illustrated in FIG. 2, the suction pump 73 is connected to the plurality of caps 71. The suction pump 73 sucks ink accumulated in the caps 71. The suction pump 73 is connected to bottom portions of the caps 71 through, for example, tubes. When the suction pump 73 is driven with the caps 71 attached to the ink heads 50, ink is sucked out of the nozzles 51 of the ink heads 50. Ink sucked by the suction pump 73 is discarded into an unillustrated waste tank through, for example, unillustrated tubes.

Figure 4:
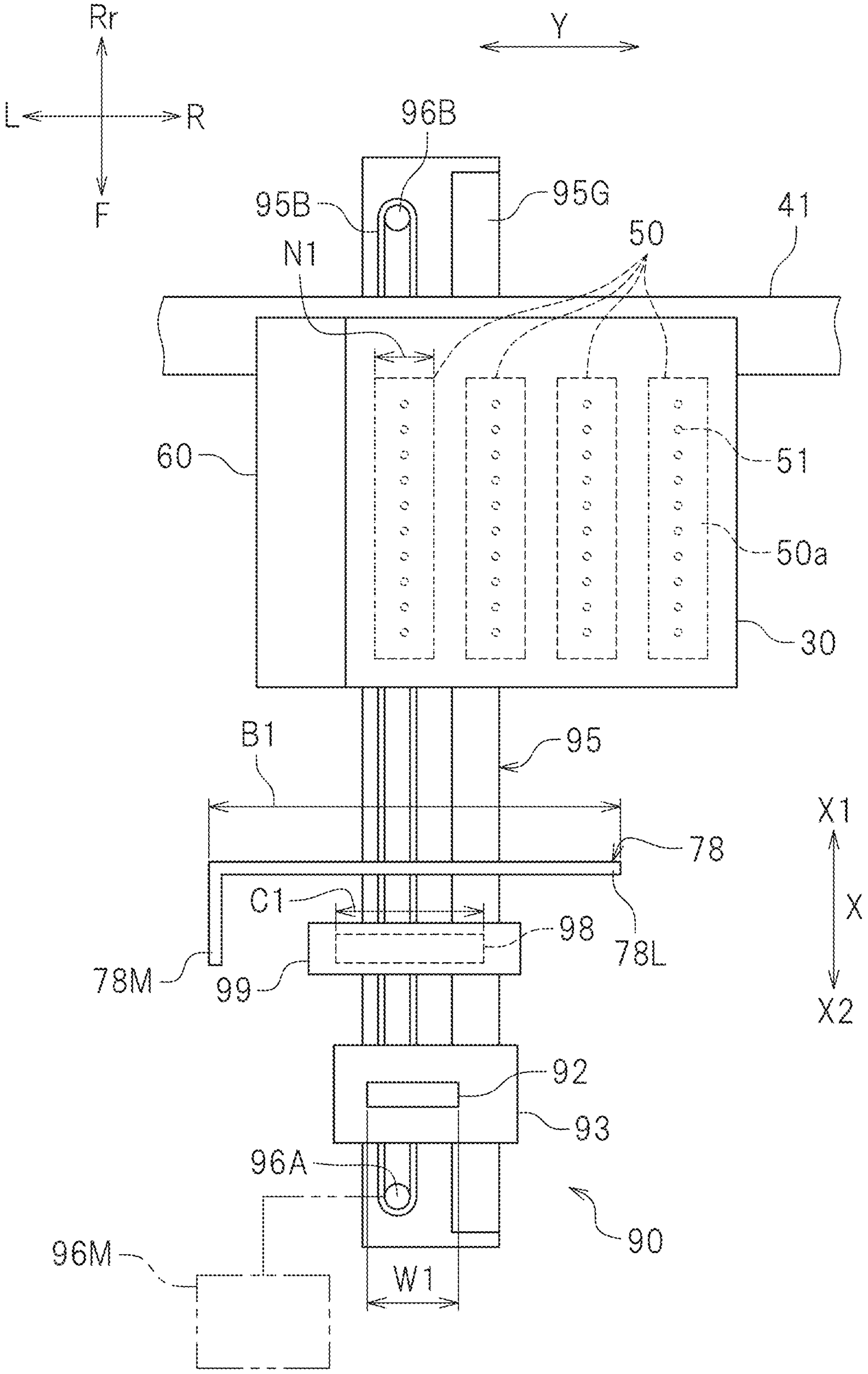
FIG. 4 is a plan view schematically illustrating a configuration of a wiping unit according to a preferred embodiment of the present invention.

As illustrated in FIG. 2, the wiping unit 90 is disposed at the left of the capping unit 70. As illustrated in FIG. 4, the wiping unit 90 includes a wiper 92, a wiper holder 93, a wiper mover 95, a wiper cleaner 98, and a cleaner holder 99.

Figure 5:
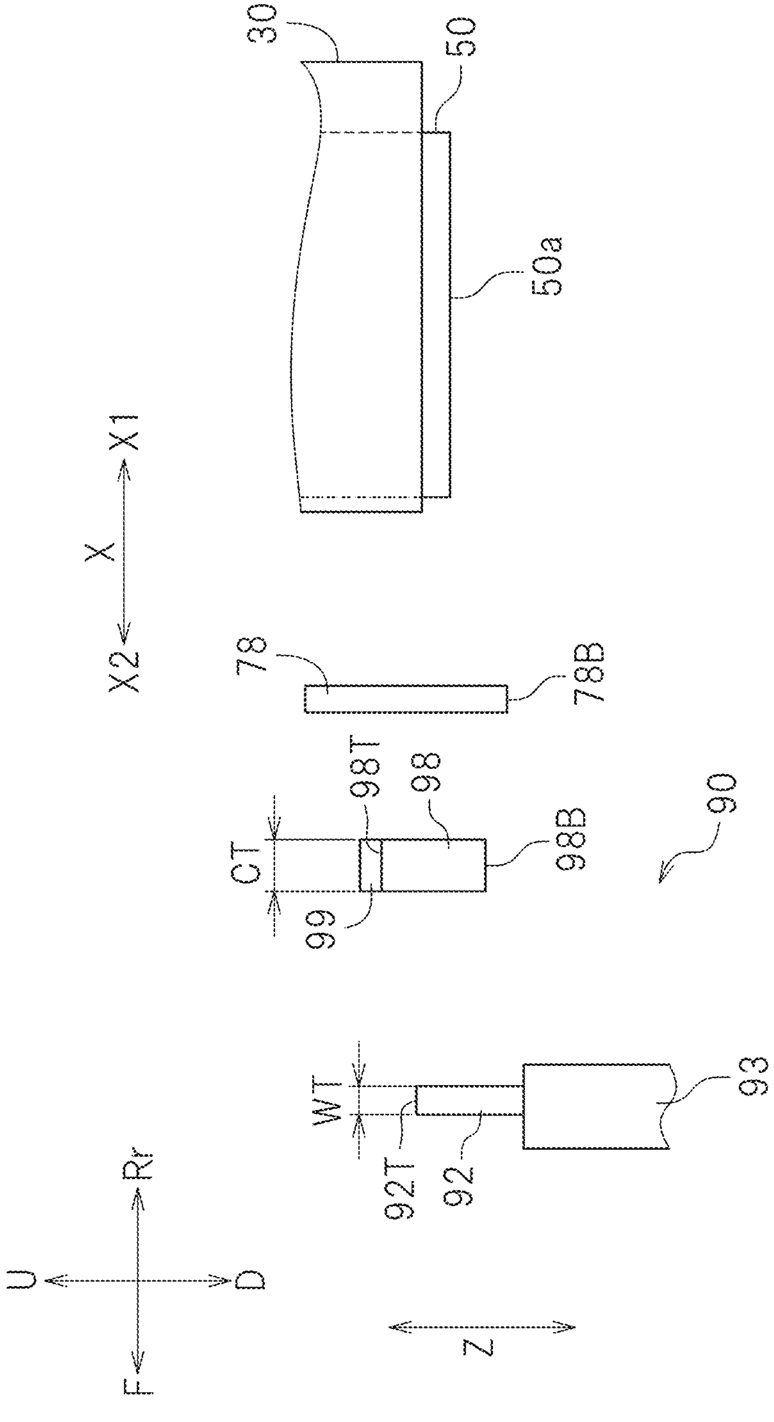
FIG. 5 is a side view schematically illustrating a configuration of a portion of a wiping unit according to a preferred embodiment of the present invention.

The wiper 92 wipes the nozzle surfaces 50*a* of the ink heads 50. The wiper 92 extends upward. The wiper 92 is made of a material harder than the wiper cleaner 98 described later. In this preferred embodiment, the wiper 92 is made of a flexible material such as rubber. As illustrated in FIGS. 4 and 5, the wiper 92 is a flat-plate member. A length W1 of the wiper 92 in the main scanning directions Y is longer than a length N1 of the nozzle surfaces 50*a* of the ink heads 50 in the main scanning directions Y. As illustrated in FIG. 5, an upper end 92T of the wiper 92 is located above the nozzle surfaces 50*a*.

As illustrated in FIG. 4, the wiper holder 93 retains the wiper 92. The wiper holder 93 retains the wiper 92 such that the wiper 92 stands substantially upright. The wiper holder 93 and the wiper 92 are located ahead of the guide rail 41 when not in use (i.e., when the nozzle surfaces 50*a* are not wiped).

The wiper mover 95 moves the wiper 92 and the wiper holder 93 in the sub-scanning directions X. The wiper mover 95 includes a guide rail 95G, a belt 95B, a front pulley 96A, a rear pulley 96B, and a driving motor 96M. The guide rail 95G extends in the sub-scanning directions X. The front end of the guide rail 95G is located ahead of the carriage 30. The rear end of the guide rail 95G is located behind the carriage 30. The wiper holder 93 is slidably engaged with the guide rail 95G. The wiper holder 93 and the wiper 92 are movable in the sub-scanning directions X along the guide rail 95G. The wiper holder 93 is fixed to the endless belt 95B. The belt 95B is wound around the front pulley 96A and the rear pulley 96B. The front pulley 96A is disposed ahead of the carriage 30. The rear pulley 96B is disposed behind the carriage 30. The driving motor 96M is attached to the front pulley 96A. The driving motor 96M is electrically connected to the controller 80 (see FIG. 2) and controlled by the controller 80. When the driving motor 96M is driven, the front pulley 96A rotates, and the belt 95B runs. Accordingly, the wiper 92 moves in the sub-scanning directions X along the guide rail 95G. That is, movement of the wiper 92 is controlled by the controller 80.

Figure 6:
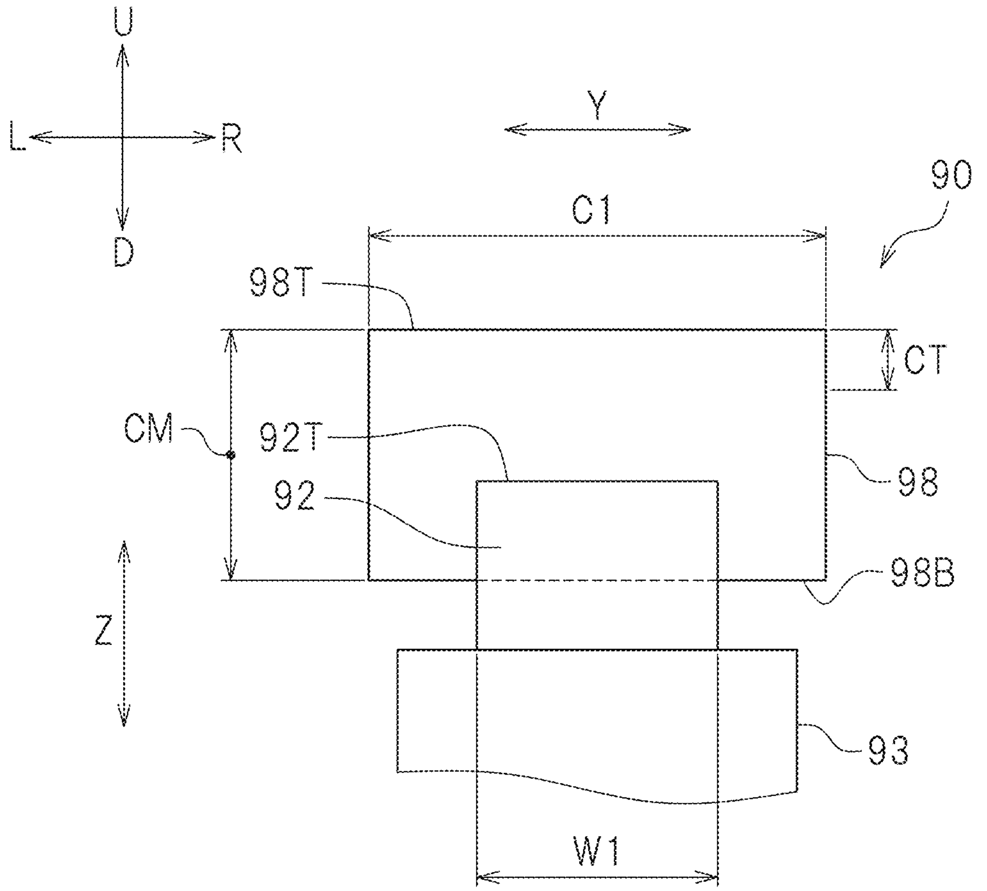
FIG. 6 is a front view schematically illustrating a configuration of a portion of a wiping unit according to a preferred embodiment of the present invention.

The wiper cleaner 98 is brought into contact with the wiper 92 and removes ink adhering to the wiper 92. The removal of ink from the wiper 92 includes the case of contacting the wiper 92 to remove ink by absorption and the case of contacting the wiper 92 to wipe off ink. As illustrated in FIG. 4, the wiper cleaner 98 extends in the main scanning directions Y. The wiper cleaner 98 is located downstream (ahead in this preferred embodiment) of the carriage 30 in the sub-scanning directions X. The wiper cleaner 98 is located on a moving path of the wiper 92. The wiper cleaner 98 is made of a flexible material, such as polyethylene or a polyolefin resin such as polypropylene. The wiper cleaner 98 has a continuous foaming structure. The wiper cleaner 98 is a flat-plate member. As illustrated in FIG. 5, the wiper cleaner 98 extends downward. A lower end 98B of the wiper cleaner 98 is located below the upper end 92T of the wiper 92. As illustrated in FIG. 6, a length C1 of the wiper cleaner 98 in the main scanning directions Y is longer than the length W1 of the wiper 92 in the main scanning directions Y. The upper end 92T of the wiper 92 is located below a portion located above an intermediate position CM of the wiper cleaner 98 in the top-bottom directions Z and below the upper end 98T of the wiper cleaner 98 by a length CT of the wiper cleaner 98 in the sub-scanning directions X (see also FIG. 5). The amount of ink absorption by the ink wiper cleaner 98 is larger than the amount of ink absorption by the wiper 92.

As illustrated in FIG. 4, the cleaner holder 99 retains the wiper cleaner 98. The cleaner holder 99 is fixed to the case 11. The wiper cleaner 98 is suspended from the cleaner holder 99. The cleaner holder 99 is located downstream (ahead in this preferred embodiment) of the carriage 30 in the sub-scanning directions X. The cleaner holder 99 includes an opening 99A (see FIG. 2), and the wiper 92 and the wiper holder 93 extend through the opening 99A.

As illustrated in FIG. 5, the wiping unit 90 includes a light shield plate 78. The light shield plate 78 blocks light applied from the light emitter 60. The light shield plate 78 is disposed between the carriage 30 and the wiper cleaner 98 in the sub-scanning directions X. In this preferred embodiment, the light shield plate 78 is disposed ahead of the carriage 30 and behind the wiper cleaner 98. As illustrated in FIG. 4, a length B1 of the light shield plate 78 in the main scanning directions Y is larger than the length C1 of the wiper cleaner 98 in the main scanning directions Y. As illustrated in FIG. 5, a lower end 78B of the light shield plate 78 is located below the lower end 98B of the wiper cleaner 98. Thus, when the wiper 92 moves in the sub-scanning directions X, the wiper 92 contacts the light shield plate 78. The lower end 78B of the light shield plate 78 may be located above the lower end 98B of the wiper cleaner 98. For example, the lower end 78B of the light shield plate 78 may be located above the upper end 92T of the wiper 92. As illustrated in FIG. 4, in this preferred embodiment, the light shield plate 78 includes a body 78L located between the wiper cleaner 98 and the carriage 30, and an extension 78M extending forward from the left end of the body 78L and located at a side (at the left in this preferred embodiment) of the wiper cleaner 98.

Figure 7:
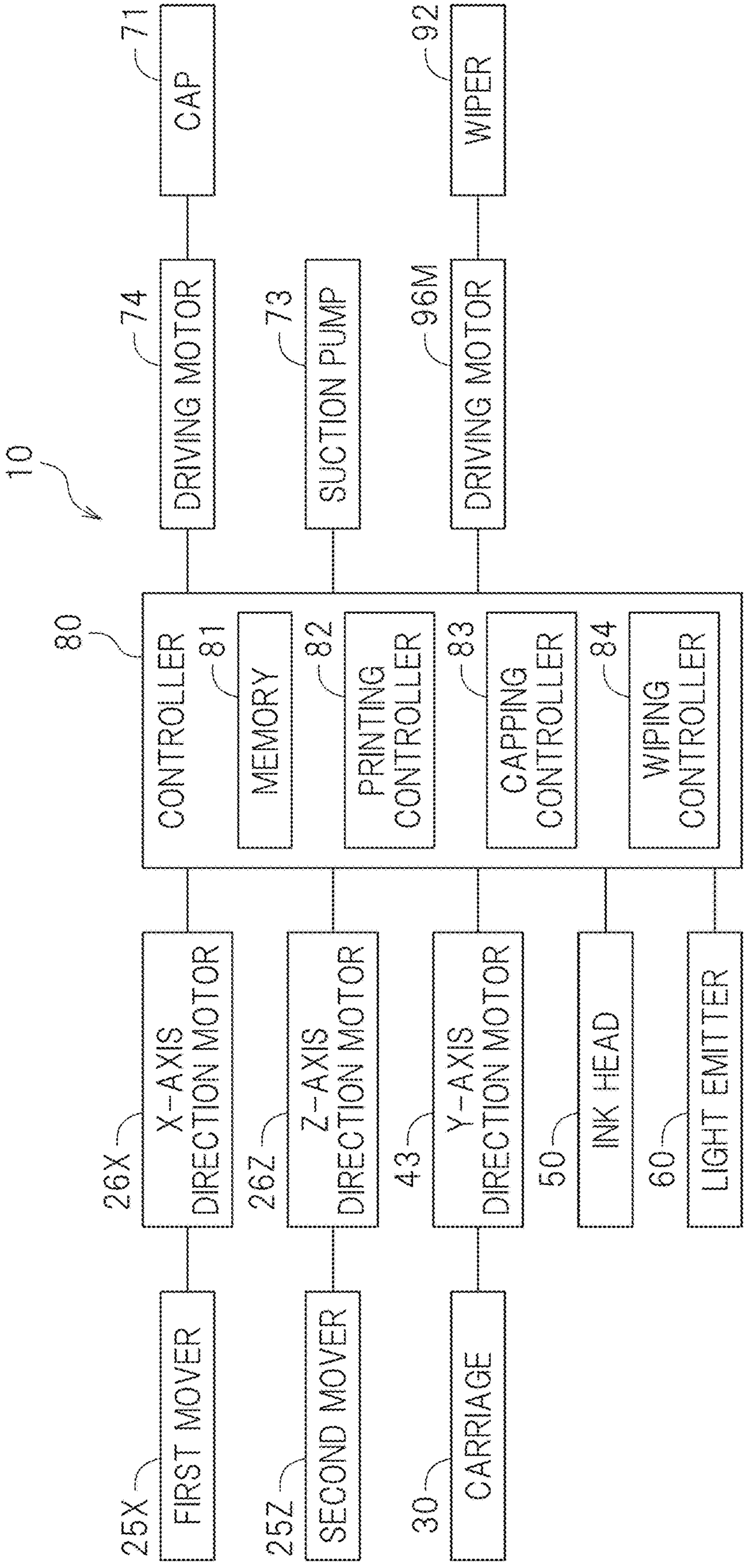
FIG. 7 is a block diagram of a control system according to a preferred embodiment of the present invention.

As illustrated in FIG. 7, an overall operation of the printer 10 is controlled by the controller 80. The controller 80 is not limited to a specific configuration. The controller 80 is, for example, a microcomputer. A hardware configuration of the microcomputer is not specifically limited. The microcomputer may include, for example. an interface (I/F) that receives printing data and other data from external equipment such as a host computer, a central processing unit (CPU) that executes an instruction of a control program, a read only memory (ROM) that stores programs to be executed by the CPU, a random access memory (RAM) that is used as a working area where programs are developed, and a memory that stores programs, various types of data, and so forth. As illustrated in FIG. 1, the controller 80 is disposed inside the case 11. The controller 80 is not necessarily disposed inside the case 11. For example, the controller 80 may be a computer disposed outside the printer 10. In this case, the controller 80 is communicably connected to the printer 10 by wires or wirelessly.

As illustrated in FIG. 7, the controller 80 is communicably connected to the X-axis direction motor 26X, the Z-axis direction motor 26Z, the Y-axis direction motor 43, the ink heads 50, the light emitter 60, the driving motor 74, the suction pump 73, and the driving motor 96M. The controller 80 controls operations of these components.

As illustrated in FIG. 7, the controller 80 is configured or programmed to include a memory 81, a printing controller 82, a capping controller 83, and a wiping controller 84. Functions of components of the controller 80 are implemented by a program. This program is read from a recording medium such as a CD and a DVD. This program may be downloaded through the Internet. Functions of components of the controller 80 may be implemented by a processor and/or a circuit, for example. Specific functions of these elements will be described later.

The memory 81 stores image data of predetermined images to be printed on the recording medium 5. The image data is, for example, raster data. The image data is created by using software installed on a computer provided separately from the printer 10.

The printing controller 82 prints a predetermined image on the recording medium 5 based on image data stored on the memory 81. Based on the image data, the printing controller 82 performs printing by discharging ink from the ink heads 50 onto the recording medium 5. The printing controller 82 drives the Y-axis direction motor 43 to move the carriage 30 in the main scanning directions Y. The printing controller 82 drives the X-axis direction motor 26X to move the table 20 in the sub-scanning directions X. The printing controller 82 controls the light emitter 60 to apply light toward photocurable ink discharged onto the recording medium 5.

The capping controller 83 controls a capping operation. The capping controller 83 controls the cap mover 72 with the carriage 30 located above the capping unit 70, and causes the caps 71 to move upward. Accordingly, the caps 71 are attached to the ink heads 50. The capping controller 83 drives the suction pump 73 with the caps 71 attached to the ink heads 50 when necessary, and causes ink in the ink heads 50 to be discharged from the nozzles 51 to the caps 71.

The wiping controller 84 controls the wiper mover 95 such that the wiper 92 is brought into contact with the wiper cleaner 98 and then wipes the nozzle surfaces 50*a*. Specifically, the wiping controller 84 controls the wiper mover 95 such that the wiper 92 moves in the direction indicated by arrow X1 in FIG. 5 (i.e., from the downstream side to the upstream side in the sub-scanning directions X) to contact the wiper cleaner 98 and then the wiper 92 further moves in the direction of arrow X1 in FIG. 5 and wipes the nozzle surfaces 50*a*. The wiping controller 84 repeatedly performs an operation of bringing the wiper 92 into contact with the wiper cleaner 98 and an operation of wiping the nozzle surfaces 50*a* with the wiper 92, alternately. The wiping controller 84 may control the wiper mover 95 to wipe the nozzle surfaces 50*a* by the wiper 92 and then bring the wiper 92 into contact with the wiper cleaner 98. Specifically, the wiping controller 84 may control the wiper mover 95 from a state where the wiper 92 is located behind the carriage 30 to cause the wiper 92 to move in the direction indicated by arrow X2 in FIG. 5 (i.e., from the upstream side to the downstream side in the sub-scanning directions X) so that the wiper 92 wipes the nozzle surfaces 50*a*, and then to cause the wiper 92 to further move in the direction indicated by arrow X2 in FIG. 5 so that the wiper 92 is brought into contact with the wiper cleaner 98.

The wiping controller 84 controls the wiper mover 95 such that the wiper 92 stops moving when the wiper 92 contacts the wiper cleaner 98. After a lapse of a predetermined time (e.g., about one second to about five seconds), the wiping controller 84 controls the wiper mover 95 to restart movement of the wiper 92. At this time, the wiping controller 84 may control the wiper mover 95 such that a first velocity of the wiper 92 while the wiper 92 is in contact with the wiper cleaner 98 is lower than a second velocity of the wiper 92 while the wiper 92 is not in contact with the wiper cleaner 98 and the nozzle surfaces 50*a*.

As described above, in the printer 10 according to this preferred embodiment, the wiping controller 84 of the controller 80 controls the wiper mover 95 to bring the wiper 92 into contact with the wiper cleaner 98 and then to wipe the nozzle surfaces 50*a* of the ink heads 50 by the wiper 92. Since the wiper 92 is brought into contact with the wiper cleaner 98 before wiping of the nozzle surfaces 50*a* as described above, the amount of ink adhering to the wiper 92 has been removed at the wiping of the nozzle surfaces 50*a* by the wiper 92. Accordingly, the wiper 92 can remove ink from the nozzle surfaces 50*a* more effectively. The wiping controller 84 of the controller 80 may control the wiper mover 95 and bring the wiper 92 into contact with the wiper cleaner 98 after wiping of the nozzle surfaces 50*a* by the wiper 92. In the manner described above, since the wiper 92 is brought into contact with the wiper cleaner 98 after wiping of the nozzle surfaces 50*a*, the amount of ink adhering to the wiper 92 has been reduced at next wiping of the nozzle surfaces 50*a* by the wiper 92. Accordingly, the wiper 92 can remove ink from the nozzle surfaces 50*a* more effectively.

In the printer 10 according to this preferred embodiment, the wiper cleaner 98 preferably has the continuous foaming structure and is made of a polyolefin resin. Thus, a larger amount of ink adhering to the wiper 92 can be removed more quickly.

The printer 10 according to this preferred embodiment includes the light emitter 60 mounted on the carriage 30 to apply light toward photocurable ink discharged onto the recording medium 5, and the light shield plate 78 disposed between the carriage 30 and the wiper cleaner 98 in the sub-scanning directions X to block light applied from the light emitter 60. When light applied from the light emitter 60 reaches photocurable ink adhering to the wiper 92, the photocurable ink might be solidified on the wiper 92. It can be difficult to remove the solidified photocurable ink by the wiper cleaner 98 in some cases, and thus, wiping performance of the wiper 92 might degrade. However, since the printer 10 according to this preferred embodiment includes the light shield plate 78, it is possible to reduce or prevent the arrival of light from the light emitter 60 at the wiper cleaner 98. Thus, ink adhering to the wiper 92 can be removed by the wiper cleaner 98 more effectively.

In the printer 10 according to this preferred embodiment, the light shield plate 78 can contact the wiper 92. Thus, ink adhering to the wiper 92 can also be removed by the light shield plate 78.

In the printer 10 according to this preferred embodiment, the wiping controller 84 of the controller 80 controls the wiper mover 95 and stops movement of the wiper 92 when the wiper 92 contacts the wiper cleaner 98. Thus, a larger amount of ink adhering to the wiper 92 can be removed by the wiper cleaner 98.

In the printer 10 according to this preferred embodiment, the first velocity of the wiper 92 while the wiper 92 is in contact with the wiper cleaner 98 may be lower than the second velocity of the wiper 92 while the wiper 92 is not in contact with the wiper cleaner 98 and the nozzle surfaces 50*a*. A larger amount of ink adhering to the wiper 92 can be removed by increasing the duration in which the wiper 92 is in contact with the wiper cleaner 98.

In the printer 10 according to this preferred embodiment, the amount of ink absorption by the ink wiper cleaner 98 is larger than the amount of ink absorption by the wiper 92. Thus, a larger amount of ink adhering to the wiper 92 can be removed by the wiper cleaner 98.

In the printer 10 according to this preferred embodiment, the length C1 of the wiper cleaner 98 in the main scanning directions Y is longer than the length W1 of the wiper 92 in the main scanning directions Y. Thus, a larger amount of ink adhering to the wiper 92 can be removed by the wiper cleaner 98.

In the printer 10 according to this preferred embodiment, the wiper 92 is made of a material harder than the wiper cleaner 98. Thus, while the wiper 92 is passing through the wiper cleaner 98, the wiper cleaner 98 can contact a large portion of the upper end 92T of the wiper 92, and thus, a larger amount of ink adhering to the wiper 92 can be removed.

In the printer 10 according to this preferred embodiment, the upper end 92T of the wiper 92 may be located below a portion located above the intermediate position CM of the wiper cleaner 98 in the top-bottom directions Z and below a position located below the upper end 98T of the wiper cleaner 98 by the length CT of the wiper cleaner 98 in the sub-scanning directions X. Accordingly, the contact surface between the wiper 92 and the wiper cleaner 98 increases, and thus, a larger amount of ink adhering to the wiper 92 can be removed by the wiper cleaner 98.

The foregoing description is directed to the preferred embodiments of the present teaching. The preferred embodiments described above, however, are merely examples, and the present teaching can be performed in various preferred embodiments, modifications, modes, etc.

Figure 8:
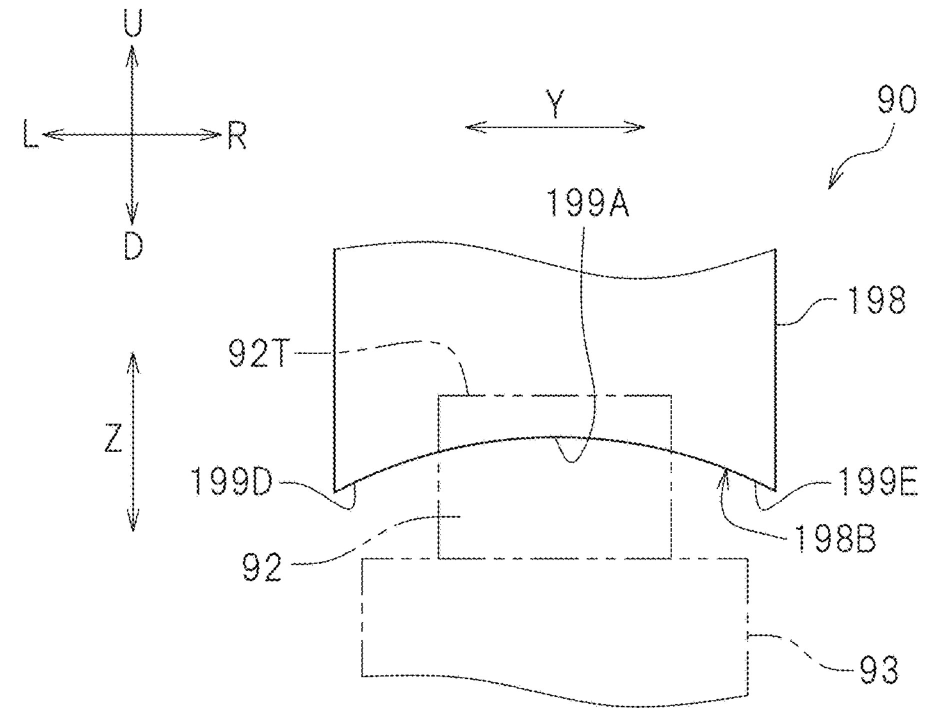
FIG. 8 is a front view schematically illustrating a configuration of a portion of a wiping unit according to another preferred embodiment of the present invention.

In the preferred embodiments, the lower end 98B of the wiper cleaner 98 is linear shaped, but the present teaching is not limited to this example. For example, as illustrated in FIG. 8, a lower end portion 198B of the wiper cleaner 198 may have an arc shape. Specifically, the lower end portion 198B of the wiper cleaner 198 may include a contact portion 199A that is to contact the wiper 92, a first extension 199D extending downward toward one side in the main scanning directions Y (leftward in this preferred embodiment) from the contact portion 199A, and a second extension 199E extending downward toward the other side in the main scanning directions Y (rightward in this preferred embodiment) from the contact portion 199A. Accordingly, ink that was brought into contact with the wiper 92 and adheres to the contact portion 199A can flow to the first extension 199D and the second extension 199E by self weight of the ink, and thus, the amount of ink included in the contact portion 199A is reduced.

In the preferred embodiments described above, the wiper 92 is made of a material harder than the wiper cleaner 98, but the present teaching is not limited to this example. That is, the wiper cleaner 98 may be made of a material harder than the wiper 92. In this case, even ink that adheres to the wiper 92 and is relatively solidified can be appropriately removed by the wiper cleaner 98.

Figure 9:
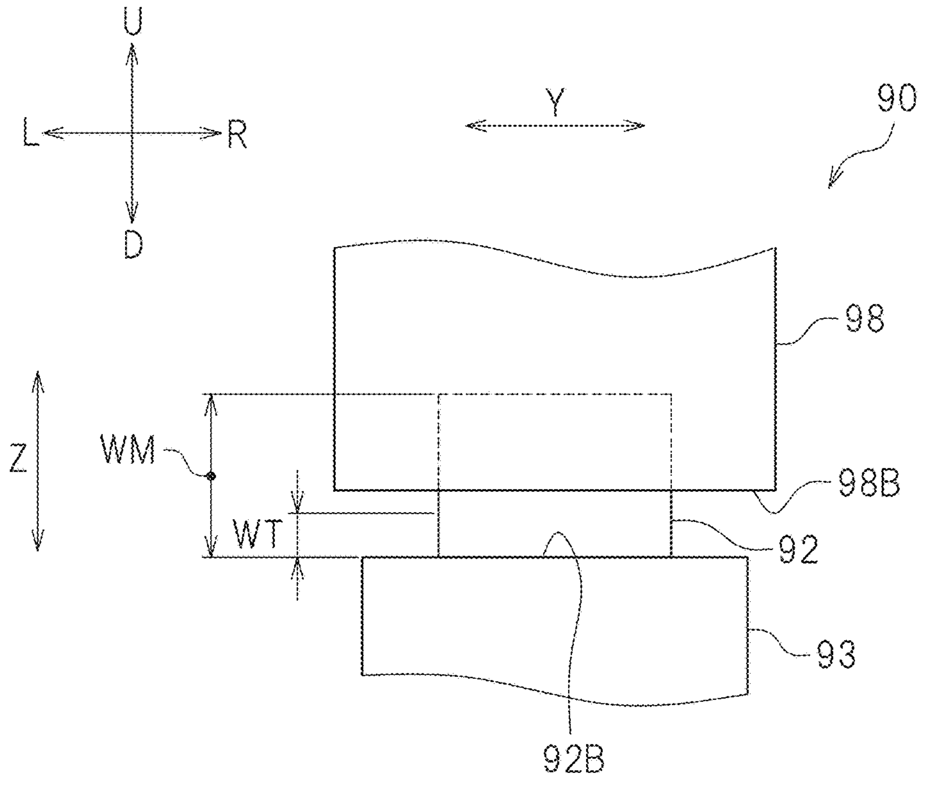
FIG. 9 is a front view schematically illustrating a configuration of a portion of a wiping unit according to another preferred embodiment of the present invention.

In the case where the wiper cleaner 98 is made of a material harder than the wiper 92, as illustrated in FIG. 9, the lower end 98B of the wiper cleaner 98 is located below the intermediate position WM of the wiper 92 in the top-bottom directions Z, and above a position located above the lower end 92B of the wiper 92 (i.e., the upper end of the wiper holder 93) by a length WT (see also FIG. 5) of the wiper 92 in the sub-scanning directions X. Accordingly, the contact area between the wiper cleaner 98 and the wiper 92 increases, and thus, a larger amount of ink adhering to the wiper 92 can be removed by the wiper cleaner 98.

Figure 10:
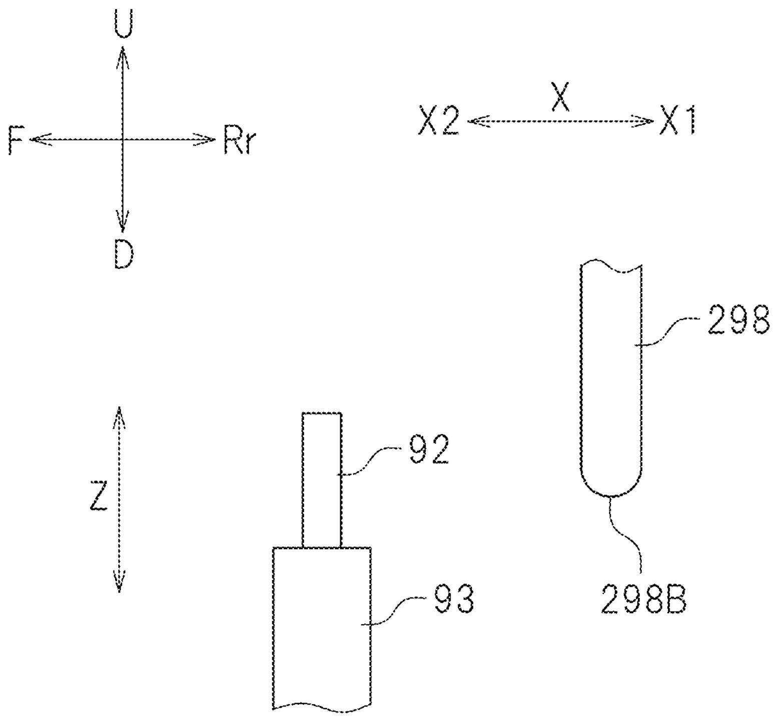
FIG. 10 is a side view schematically illustrating a configuration of a wiper cleaner according to another preferred embodiment of the present invention.

As illustrated in FIG. 10, a lower end portion 298B of a wiper cleaner 298 may have an arc shape when seen in the main scanning directions Y. Accordingly, the contact area between the wiper 92 and the wiper cleaner 298 increases, and thus, a larger amount of ink adhering to the wiper 92 can be removed by the wiper cleaner 298.

Figure 11:
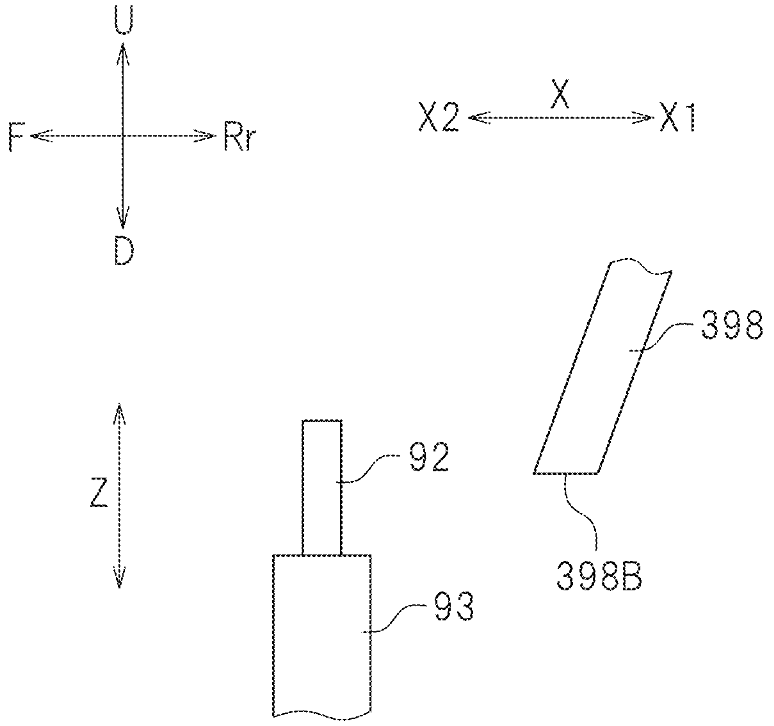
FIG. 11 is a side view schematically illustrating a configuration of a wiper cleaner according to another preferred embodiment of the present invention.
Figure 12:
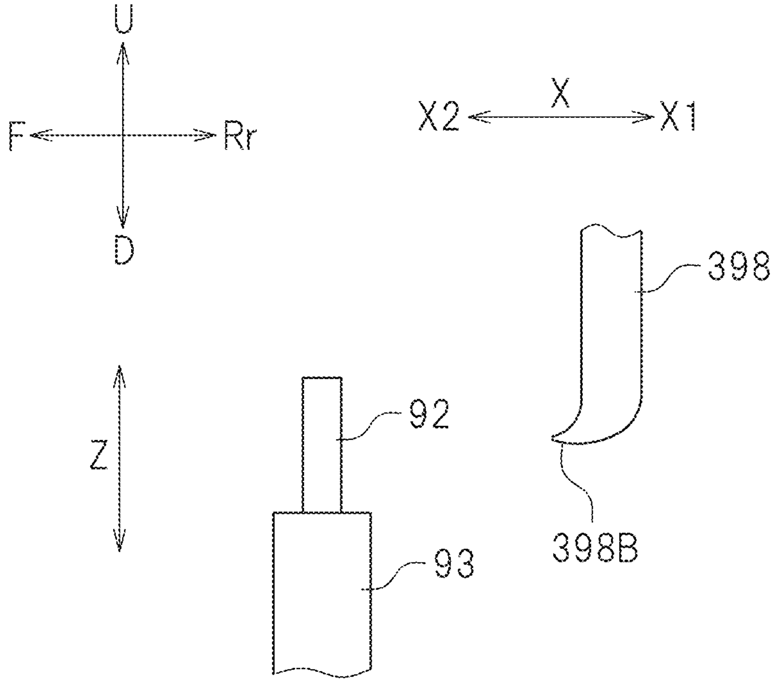
FIG. 12 is a side view schematically illustrating a configuration of a wiper cleaner according to another preferred embodiment of the present invention.

As illustrated in FIGS. 11 and 12, a lower end portion 398B of a wiper cleaner 398 may tilt toward the wiper 92 when seen in the main scanning directions Y. Accordingly, even relatively solidified ink adhering to the wiper 92 can be removed by the wiper cleaner 98.

In the preferred embodiments described above, ink discharged from the nozzles 51 of the ink heads 50 is photocurable ink, but may be aqueous ink or solvent ink.

In the preferred embodiments described above, the wiper cleaner 98 and the cleaner holder 99 are located downstream (ahead in this preferred embodiment) of the carriage 30 in the sub-scanning directions X, but may be disposed upstream (behind in this preferred embodiment) of the carriage 30. The wiper holder 93 and the wiper 92 may be located behind the guide rail 41 when not in use (i.e., when the nozzle surfaces 50*a* are not wiped).

In the preferred embodiments described above, the wiper cleaner 98 is disposed parallel to the wiper 92 with respect to the sub-scanning directions X, but the wiper cleaner 98 may tilt relative to the wiper 92 with respect to the sub-scanning directions X. That is, one end of the wiper cleaner 98 in the main scanning directions Y may be located ahead of the other end of the wiper cleaner 98 in plan view. For example, the wiper cleaner 98 may be disposed such that the right end of the wiper cleaner 98 is located ahead of the left end of the wiper cleaner 98 in plan view.

The terms and expressions used herein are for description only and are not to be interpreted in a limited sense. These terms and expressions should be recognized as not excluding any equivalents to the elements shown and described herein and as allowing any modifications encompassed in the scope of the claims. The present invention may be embodied in many various forms. This disclosure should be regarded as providing preferred embodiments of the principles of the present invention. These preferred embodiments are provided with the understanding that they are not intended to limit the present invention to the preferred embodiments described in the specification and/or shown in the drawings. The present invention is not limited to the preferred embodiments described herein. The present invention encompasses any of preferred embodiments including equivalent elements, modifications, deletions, combinations, improvements and/or alterations which can be recognized by a person of ordinary skill in the art based on the disclosure. The elements of each claim should be interpreted broadly based on the terms used in the claim, and should not be limited to any of the preferred embodiments described in this specification or referred to during the prosecution of the present application.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An ink jet printer comprising:
- an ink head including a plurality of nozzles to discharge ink onto a recording medium and a nozzle surface on which the plurality of nozzles are provided;
- a carriage on which the ink head is mounted and which is movable in a main scanning direction;
- a wiper extending upward to wipe the nozzle surface;
- a wiper mover to move the wiper in a sub-scanning direction perpendicular or substantially perpendicular to the main scanning direction;
- a wiper cleaner disposed upstream or downstream of the carriage in the sub-scanning direction and extending downward to contact the wiper and remove ink adhering to the wiper; and
- a controller configured or programmed to control the carriage and the wiper mover; wherein
- the controller is configured or programmed to control the wiper mover such that the nozzle surface is wiped by the wiper after bringing the wiper into contact with the wiper cleaner, and
- an amount of ink absorption by the wiper cleaner is larger than an amount of ink absorption by the wiper.

2. The ink jet printer according to claim 1, wherein the wiper cleaner has a continuous foaming structure and is made of a polyolefin resin.

3. The ink jet printer according to claim 1, wherein the controller is configured or programmed to control the wiper mover such that movement of the wiper stops when the wiper is brought into contact with the wiper cleaner.

4. The ink jet printer according to claim 1, wherein a first velocity of the wiper while the wiper is in contact with the wiper cleaner is lower than a second velocity of the wiper while the wiper is not in contact with the wiper cleaner or the nozzle surface.

5. The ink jet printer according to claim 1, wherein a lower end portion of the wiper cleaner includes a contact portion to contact the wiper, a first extension extending downward toward one side in the main scanning direction from the contact portion, and a second extension extending downward toward another side in the main scanning direction from the contact portion.

6. The ink jet printer according to claim 1, wherein a length of the wiper cleaner in the main scanning direction is larger than a length of the wiper in the main scanning direction.

7. The ink jet printer according to claim 1, wherein the wiper cleaner is made of a material harder than the wiper.

8. The ink jet printer according to claim 7, wherein a lower end of the wiper cleaner is located above a portion below a center position of the wiper in a top-bottom direction and above a lower end of the wiper by a length of the wiper in the sub-scanning direction.

9. The ink jet printer according to claim 7, wherein a lower end portion of the wiper cleaner has an arc shape when seen in the main scanning direction.

10. The ink jet printer according to claim 7, wherein a lower end portion of the wiper cleaner tilts toward the wiper when seen in the main scanning direction.

11. The ink jet printer according to claim 1, wherein the wiper is made of a material harder than the wiper cleaner.

12. The ink jet printer according to claim 11, wherein an upper end of the wiper is located below a portion above a center position of the wiper cleaner in a top-bottom direction and below an upper end of the wiper cleaner by a length of the wiper cleaner in the sub-scanning direction.

13. An ink jet printer comprising:

an ink head including a plurality of nozzles to discharge photocurable ink onto a recording medium and a nozzle surface on which the plurality of nozzles are provided;

a carriage on which the ink head is mounted and which is movable in a main scanning direction;

a light emitter mounted on the carriage to apply light to the photocurable ink discharged onto the recording medium;

a wiper extending upward to wipe the nozzle surface;

a wiper mover to move the wiper in a sub-scanning direction perpendicular or substantially perpendicular to the main scanning direction;

a wiper cleaner disposed upstream or downstream of the carriage in the sub-scanning direction and extending downward to contact the wiper and remove photocurable ink adhering to the wiper;

a light shield plate disposed between the carriage and the wiper cleaner in the sub-scanning direction to block light applied from the light emitter and capable of contacting the wiper; and a controller configured or programmed to control the carriage and the wiper mover; wherein the controller is configured or programmed to control the wiper mover such that the nozzle surface is wiped by the wiper after bringing the wiper into contact with the wiper cleaner or to bring the wiper into contact with the wiper cleaner after wiping the nozzle surface by the wiper.

14. An ink jet printer comprising:

an ink head including a plurality of nozzles to discharge ink onto a recording medium and a nozzle surface on which the plurality of nozzles are provided;

a carriage on which the ink head is mounted and which is movable in a main scanning direction;

a wiper extending upward to wipe the nozzle surface;

a wiper mover to move the wiper in a sub-scanning direction perpendicular or substantially perpendicular to the main scanning direction;

a wiper cleaner disposed upstream or downstream of the carriage in the sub-scanning direction and extending downward to contact the wiper and remove ink adhering to the wiper; and a controller configured or programmed to control the carriage and the wiper mover; wherein a length of the wiper cleaner in the main scanning direction is larger than a length of the wiper in the main scanning direction; and the controller is configured or programmed to control the wiper mover such that the wiper is brought into contact with the wiper cleaner after wiping the nozzle surface by the wiper.

15. The ink jet printer according to claim 14, wherein the controller is configured or programmed to control the wiper mover such that movement of the wiper stops when the wiper is brought into contact with the wiper cleaner.

16. The ink jet printer according to claim 14, wherein a first velocity of the wiper while the wiper is in contact with the wiper cleaner is lower than a second velocity of the wiper while the wiper is not in contact with any of the wiper cleaner and the nozzle surface.

17. The ink jet printer according to claim 14, wherein a lower end portion of the wiper cleaner includes a contact portion to contact the wiper, a first extension extending downward toward one side in the main scanning direction from the contact portion, and a second extension extending downward toward another side in the main scanning direction from the contact portion.

18. The ink jet printer according to claim 14, wherein an amount of ink absorption by the wiper cleaner is larger than an amount of ink absorption by the wiper.

19. The ink jet printer according to claim 14, wherein the wiper cleaner is made of a material harder than the wiper.

* * * * *